J. JENNINGS.
Horse Hay-Fork.
No. 85,669.
Patented Jan. 5, 1869.
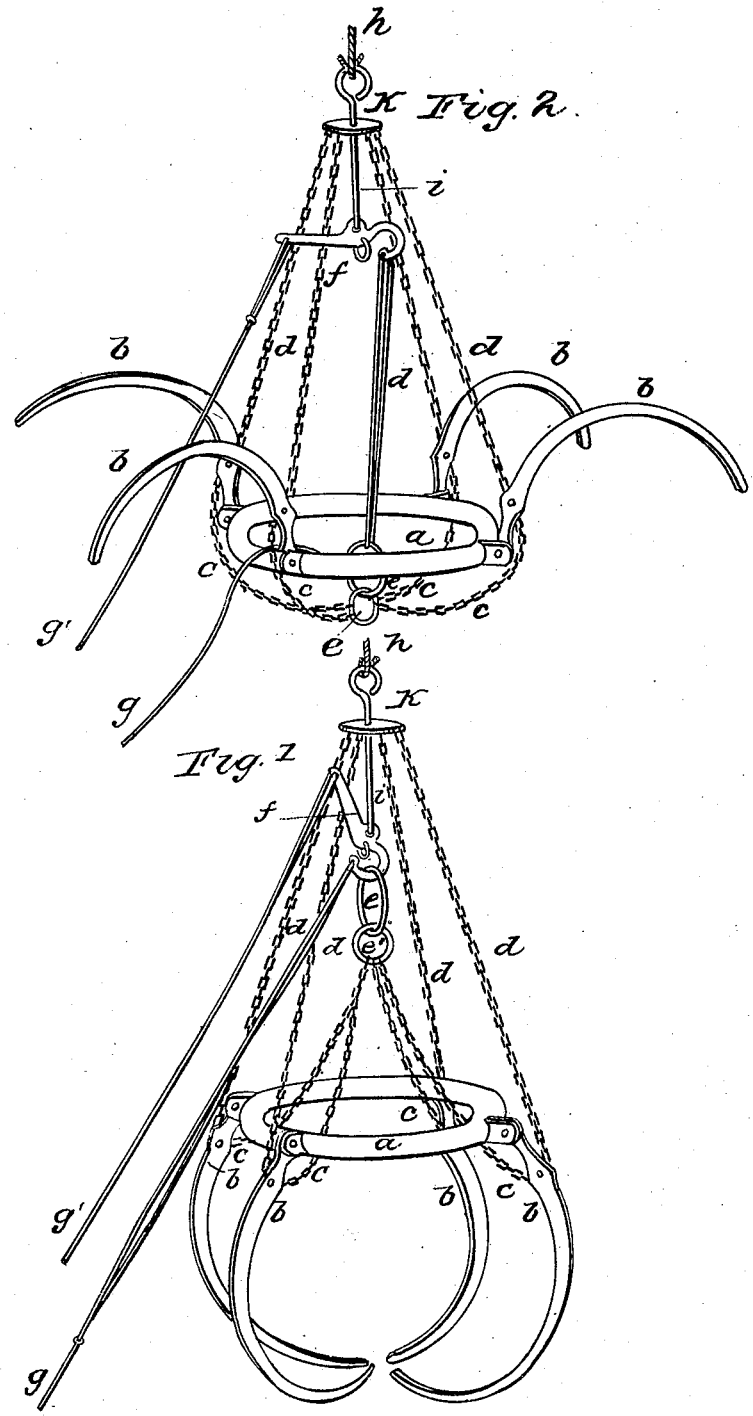

UNITED STATES PATENT OFFICE.

JOSEPH JENNINGS, OF JACKSONVILLE, ILLINOIS.

Letters Patent No. 85,669, dated January 5, 1869.

IMPROVEMENT IN HORSE HAY-FORKS.

The Schedule referred to in these Letters Patent and making part of the same.

Be it known that I, JOSEPH JENNINGS, of Jacksonville, in the county of Morgan, and State of Illinois, have invented a new, useful, and improved Horse Hay-Fork, for handling hay, grain, and other substances by horse-power; and I do hereby declare the following to be a full, clear, and exact description of the construction and operation of the same, reference being had to the annexed drawings, making a part of this specification, in which—

Figure 1 is a view of the machine with its load grappled.

Figure 2 is a view of the machine with its load ungrappled.

$a$ is the frame.

$b\ b\ b\ b$ are the teeth, or tines.

$c\ c\ c\ c$ are the inside lifting-chains.

$d\ d\ d\ d$ are the outside lifting-chains.

E and E' are the rings to which the lifting-chains $c\ c\ c\ c$ are attached.

$f$ is the lever-hook, which hooks and unhooks the chains $c\ c\ c\ c$.

$g$ is the connecting-rope by which the lever-hook $f$ is drawn into the ring E.

$g'$ is the connecting-rope attached to the long end of the lever-hook $f$, and by which the inside lifting-chains $c\ c\ c\ c$ are unfastened.

$h$ is a supporting-rope, by which the load is taken up by means of pulleys or derrick.

$i$ is a rod, with a ring above, enclosing the lever-hook $f$, and a ring at the opposite end, enclosing the rope $h$, and fastened to the collar $k$.

$k$ is a collar, to which the outside lifting-chains $d\ d\ d\ d$ are attached.

A careful inspection of the drawings will give a better idea of the machine and its operation, but, in general terms, the construction is as follows, so far as its substantial parts are concerned:

The frame $a$ is made of any suitable material, and may be circular in form, as shown in the drawings, or oblong or square, as convenience dictates, the principle of hooking and unhooking the inside and outside connecting-chains being the same, whatever the form of the frame may be.

The teeth or tines $b\ b\ b\ b$ are nearly semicircular in form, fastened to the frame at one end by a joint or pivot, so as to swing up and down upon said joint, and are closed, so as to grapple their load, by the draught upon the inside connecting-chains $c\ c\ c\ c$, and are opened, so as to unload, by the draught upon the outside connecting-chains $d\ d\ d\ d$. They may be made of any suitable material, and as many used as the material requires, the principle being the same, whether four or any other number are used.

The inside lifting-chains $c\ c\ c\ c$ may be chains or ropes, being attached at one end upon the inside of the teeth $b\ b\ b\ b$, and passing under the frame $a$, the opposite ends being attached to rings, into one of which rings the lever-hook $f$ automatically hooks itself when the rope $g$ is pulled.

The outside lifting-chains $d\ d\ d\ d$ are attached to the teeth $b\ b\ b\ b$, upon the outside of the frame $a$, and passing up upon the outside of said frame, are fastened to the collar $k$ at the opposite end.

Having described a sufficient number of parts to give an idea of the whole, in connection with the drawings, the operation will be as follows:

Let it be supposed that the fork has its load grappled, as shown in fig. 1, and is suspended over the stack by the derrick and supporting-rope $h$, and that the operator desires to unload the fork upon the stack. To unload, he simply gives a jerk to the connecting-rope $g'$, attached to the long end of the lever-hook $f$, and the ring E slips off from the hook $f$, thus loosening the inside lifting-chains $c\ c\ c\ c$, and the weight of the machine and its load instantly comes upon the outside chains $d\ d\ d\ d$, thus opening the teeth and dropping out the load, and placing the fork in the position shown in the drawings, fig. 2.

The fork is then dropped, in its open position, as shown in fig. 2, down upon the hay, to grapple another load. When it rests upon the hay, the outside chains slacken up, the lever-hook $f$ going clear down upon the hay, and the operator gives a jerk to the rope $g$, which draws the ring E into the hook $f$, and the fork is at once drawn up by the rope $h$, and as it rises it grapples its load, and instantly assumes the position shown in the drawings, fig. 1, when it is taken to the top of the stack and unloaded as before described.

Having thus described the parts, construction, and operation of my invention,

What I claim as new, and desire to secure by Letters Patent, is—

1. The lever-hook $f$, in connection with the rod $i$ and the ropes $g$ and $g'$, attached to opposite ends of the lever-hook, as set forth and described.

2. The combination of the rod $i$, provided with the hook $f$, chains $c$ and $d$, and tines $b$, arranged and operating substantially as described.

JOSEPH JENNINGS.

Witnesses:
WM. P. BARR,
HENRY RICE.